United States Patent
Laflamme et al.

(10) Patent No.: US 7,489,986 B1
(45) Date of Patent: Feb. 10, 2009

(54) SPA CONTROLLER COMPUTER INTERFACE FOR SPAS

(75) Inventors: Benoit Laflamme, Quebec City (CA); Michel Authier, St-Augustin (CA); Jean-Luc Trahan, St-Nicolas (CA)

(73) Assignee: Gecko Alliance Group Inc., Quebec, Quebec (CA)

(*) Notice: Subject to any disclaimer, the term of this patent is extended or adjusted under 35 U.S.C. 154(b) by 53 days.

(21) Appl. No.: 09/709,787

(22) Filed: Nov. 7, 2000

(51) Int. Cl.
*G05B 15/00* (2006.01)
*G05D 11/00* (2006.01)

(52) U.S. Cl. .............. 700/278; 700/282; 392/465; 340/825; 717/171; 717/172; 717/173

(58) Field of Classification Search ............ 392/465; 340/825; 700/275, 278, 282; 717/171–173
See application file for complete search history.

(56) References Cited

U.S. PATENT DOCUMENTS

| | | | | | |
|---|---|---|---|---|---|
| 5,361,215 | A | * | 11/1994 | Tompkins et al. ............ 700/300 |
| 5,550,753 | A | * | 8/1996 | Tompkins et al. ............ 700/300 |
| 5,559,720 | A | * | 9/1996 | Tompkins et al. ............ 700/300 |
| 5,706,191 | A | * | 1/1998 | Bassett et al. .................. 700/9 |
| 5,764,639 | A | * | 6/1998 | Staples et al. ................ 370/401 |
| 5,769,527 | A | * | 6/1998 | Taylor et al. .................. 362/85 |
| 5,822,012 | A | * | 10/1998 | Jeon et al. .................... 348/553 |
| 5,838,226 | A | * | 11/1998 | Houggy et al. ......... 340/310.01 |
| 5,877,957 | A | * | 3/1999 | Bennett ........................ 700/86 |
| 5,918,194 | A | * | 6/1999 | Banaska et al. ................ 702/91 |
| 5,932,127 | A | * | 8/1999 | Maddox ...................... 219/492 |
| 6,192,282 | B1 | * | 2/2001 | Smith et al. .................... 700/19 |
| 6,253,227 | B1 | * | 6/2001 | Tompkins et al. ........... 709/201 |
| 6,259,442 | B1 | * | 7/2001 | Britt et al. .................... 715/721 |
| 6,282,370 | B1 | * | 8/2001 | Cline et al. .................. 392/465 |
| 6,355,913 | B1 | * | 3/2002 | Authier et al. .............. 219/481 |
| 6,407,469 | B1 | * | 6/2002 | Cline et al. .................... 307/11 |
| 6,439,824 | B1 | * | 8/2002 | Harris et al. ........... 414/416.03 |
| 6,459,959 | B1 | * | 10/2002 | Williams et al. ............ 700/284 |
| 6,487,717 | B1 | * | 11/2002 | Brunemann et al. ......... 717/173 |
| 2002/0016639 | A1 | * | 2/2002 | Smith et al. .................... 700/9 |
| 2002/0035403 | A1 | * | 3/2002 | Clark et al. .................... 700/65 |
| 2002/0069460 | A1 | * | 6/2002 | Huffington et al. ........... 4/541.1 |
| 2002/0070611 | A1 | * | 6/2002 | Cline et al. .................. 307/149 |
| 2002/0171365 | A1 | * | 11/2002 | Morgan et al. ................ 315/56 |

* cited by examiner

*Primary Examiner*—Michael D Masinick (57) ABSTRACT

A remotely controlled and monitored spa. An interface signal converter is electrically connected to a spa controller. A remote computer can control the spa and monitor the status of the spa via a communications link between the remote computer and the interface signal converter. The interface signal converter converts communications signals transferred from the remote computer via the communications link and directs the converted signals to the spa controller. Also, the interface signal converter converts signals from the spa controller to be communicated to the remote computer via the communications link. In a preferred embodiment, the interface signal converter comprises an IR and an RS-485 transceiver. In a preferred embodiment, the communications link is the Internet.

53 Claims, 12 Drawing Sheets

| | | |
|---|---|---|
| WATER PUMP 1P: | ON, HIGH SPEED ▼ | |
| WATER PUMP 2P: | OFF ▼ | OWNER PAGE |
| WATER PUMP 3P: | NOT INSTALLED ▼ | |
| AIR BLOWER: | ON, MEDIUM SPEED ▼ | CURRENT TIME: 01:38 PM |
| CIRCULATION PUMP: | NOT INSTALLED ▼ | SET POINT: 102  ● F |
| OZONATOR: | OFF | WATER TEMP: 98  ○ C |
| LIGHT 1L: | ON, LOW INTENSITY ▼ | HEATER OFF |
| LIGHT 2L: | NOT INSTALLED ▼ | ERROR ON DISPLAY: PRESSURE SWITCH OPEN |
| | | PLUMBING FREEZE: LOW DANGER |
| AUXILIARY 1A: | OFF ▼ | |

PUMP, BLOWER TIMEOUT:

20 MIN.　　　　　60 MIN.

LIGHT TIMEOUT

30 MIN.　　　　　240 MIN.

[ UPDATE INFO ]　[ QUIT ]

SPA
MANUFACTURER
PAGE

| | | | | | | |
|---|---|---|---|---|---|---|
| WATER PUMP 1P: | 2-SPEED ▼ | LOW SPEED: | 6 | AMPS | HIGH SPEED: 11 | AMPS |
| WATER PUMP 2P: | 1-SPEED ▼ | LOW SPEED: | 6 | AMPS | HIGH SPEED: 11 | AMPS |
| WATER PUMP 3P: | NOT INSTALLED ▼ | 0 | AMPS | | | |
| AIR BLOWER: | 3-SPEED ▼ | 6 | AMPS | | | |

HEATER ELEMENT: 23 AMPS
MAX DRAW IN LC: 30 AMPS
MAX DRAW IN HC: 50 AMPS

QUIT

FIG. 11

SPA CONTROLLER
MANUFACTURER
PAGE

MIN. SET POINT: 59 F
MAX. SET POINT: 104 F

REGULATION OVERTEMP THRESHOLD: 112 F

|  | KEYPAD: | IR REMOTE: |
|---|---|---|
| KEY #1: | W. PUMP 1P ↓ | W. PUMP 1P ↓ |
| KEY #2: | W. PUMP 2P ↓ | W. PUMP 2P ↓ |
| KEY #3: | AIR BLOWER ↓ | AIR BLOWER ↓ |
| KEY #4: | LIGHT ↓ | LIGHT ↓ |
| KEY #5: | FILTER ↓ | UNUSED ↓ |

SPA CONTROLLER COMPUTER INTERFACE FOR SPAS

BACKGROUND OF THE INVENTION

A spa (also commonly known as a "hot tub") is a therapeutic bath in which all or part of a person's body is exposed to hot water, usually with forceful whirling currents. When located indoors and equipped with fill and drain features like a bathtub, the spa is typically referred to as a "whirlpool bath". Typically, the spa's hot water is generated when water contacts a heating element in a water circulating heating pipe system.

Figure 1:
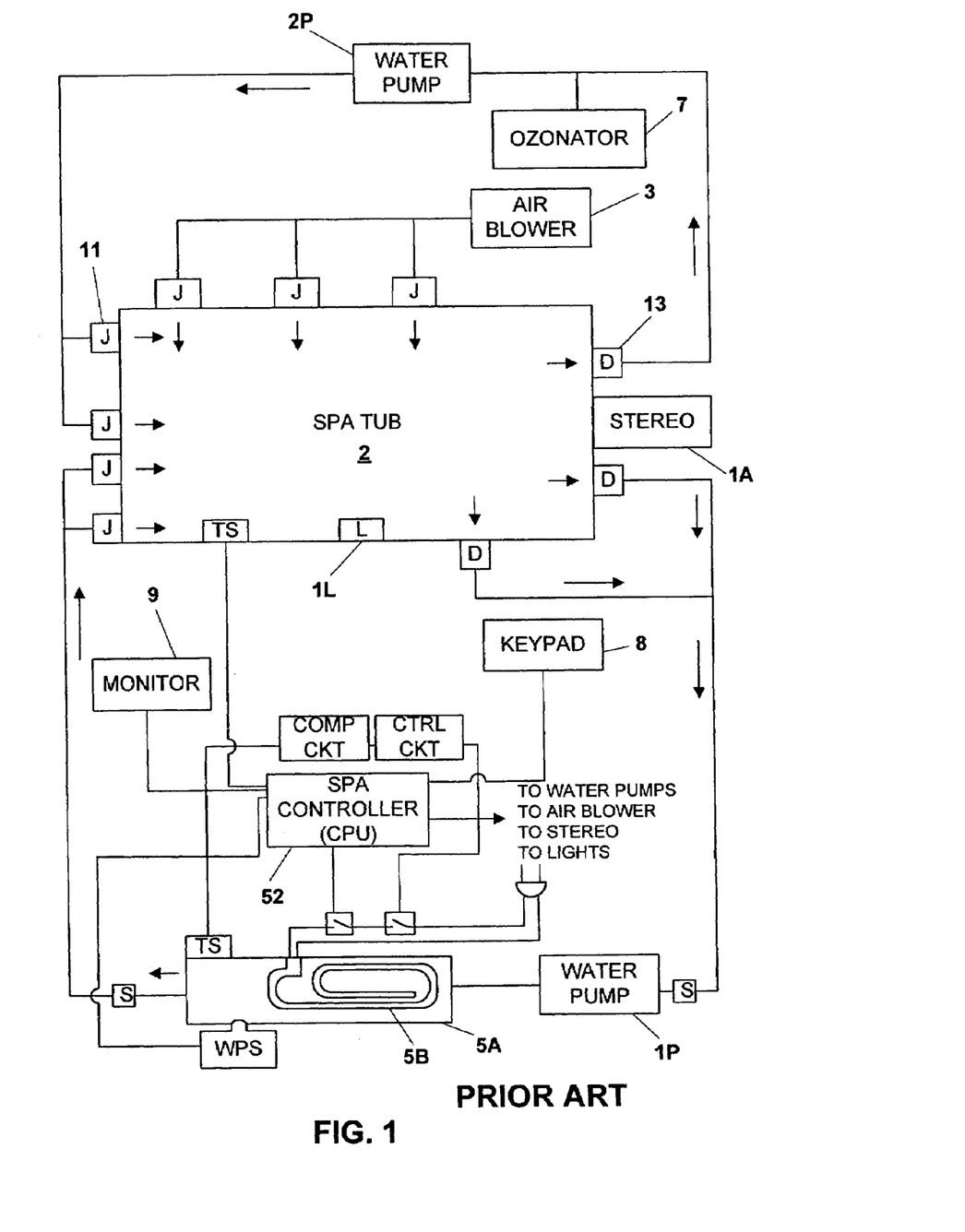
FIG. 1 shows a prior art spa.

FIG. 1 shows prior art hot tub spa 1. Spa controller 52 is programmed to control the spa's components, such as the spa's water pumps 1P and 2P, air blower 3, ozonator 7, stereo 1A, and light 1L. In normal operation, water is pumped by water pump 1P through heater 5A where it is heated by heating element 5B. The heated water then leaves heater 5A and enters spa tub 2 through jets 11. Water leaves spa tub 2 through drains 13 and the cycle is repeated.

A user of the spa can control the spa's components by pressing keys on keypad 8. Also, when an error occurs (such as a failure of water pump 2P), the source of the error is displayed on monitor 9. Currently, the spa user can only operate the spa only from within the spa or next to the spa by manipulating keypad 8. Also, currently, if there is a problem with the spa, a service technician or repairman must go to the location of the spa in order to troubleshoot and conduct repairs. The service technician needs to physically inspect the spa and its components and monitor 9.

The Internet

The Internet is a large network of interconnected computers that is sometimes referred to as a Wide Area Network (WAN). Initially developed by the United States Defense Department, it has expanded worldwide to a great variety of uses. A significant percentage of the population in the United States and in many other countries currently has access to the Internet and its use is growing rapidly.

The Internet is used to advertise products. Many companies have WEB sites and encourage potential customers to "visit" these pages. Creation of WEB sites is a well-developed Internet business with a great many people and organizations offering to create WEB sites. In addition, many books are available at almost all large book stores providing instructions for individuals to create their own WEB sites. One such book is *Build Your Own Web Site* by Louis Kahn and Laura Logan, published by Microsoft Press with offices in Redmond, Wash. Most WEB sites are static, i.e. there is no interaction between user and the WEB site. However, there are many well-known techniques that permit the WEB site to be made active as discussed at page 144-153 of the Kahn and Logan reference. These techniques permit an Internet server to change WEB pages as often as desired and they permit users to communicate with a processor associated with the WEB site.

The technology also exists to establish a Local Area Network (LAN). A LAN is a network of interconnected workstations sharing the resources of a single processor or server within a relatively small geographic area. Typically, this might be within the area of a small office building. A suite of application programs can be kept on the LAN server. Users who frequently need an application can download it once and then run it from their local hard disk.

An Intranet is a network connecting an affiliated set of users (usually limited to a specific community of interest) using standard Internet protocols, esp. TCP/IP and HTTP. Intranets, also known as internal Webs, are only logically "internal" to an organization. Physically they can span the globe, as long as access is limited to the defined community of interest. To draw a comparison, the World Wide Web comprises all HTTP nodes on the public Internet. An internal web may comprise all HTTP nodes on a private network, such as an organization's LAN or WAN. IF the organization is a corporation, the internal web is also a corporate web.

What is needed is a better device for controlling and monitoring spas.

SUMMARY OF THE INVENTION

The present invention provides a remotely controlled and monitored spa. An interface signal converter is electrically connected to a spa controller. A remote computer can control the spa and monitor the status of the spa via a communications link between the remote computer and the signal converter. The signal converter converts communications signals transferred from the remote computer via the communications link and directs the converted signals to the spa controller. Also, the signal converter converts signals from the spa controller to be communicated to the remote computer via the communications link. In a preferred embodiment, the signal converter comprises an IR and an RS-485 transceiver. In a preferred embodiment, the communications link is the Internet.

DETAILED DESCRIPTION OF THE PREFERRED EMBODIMENTS

Figure 2:
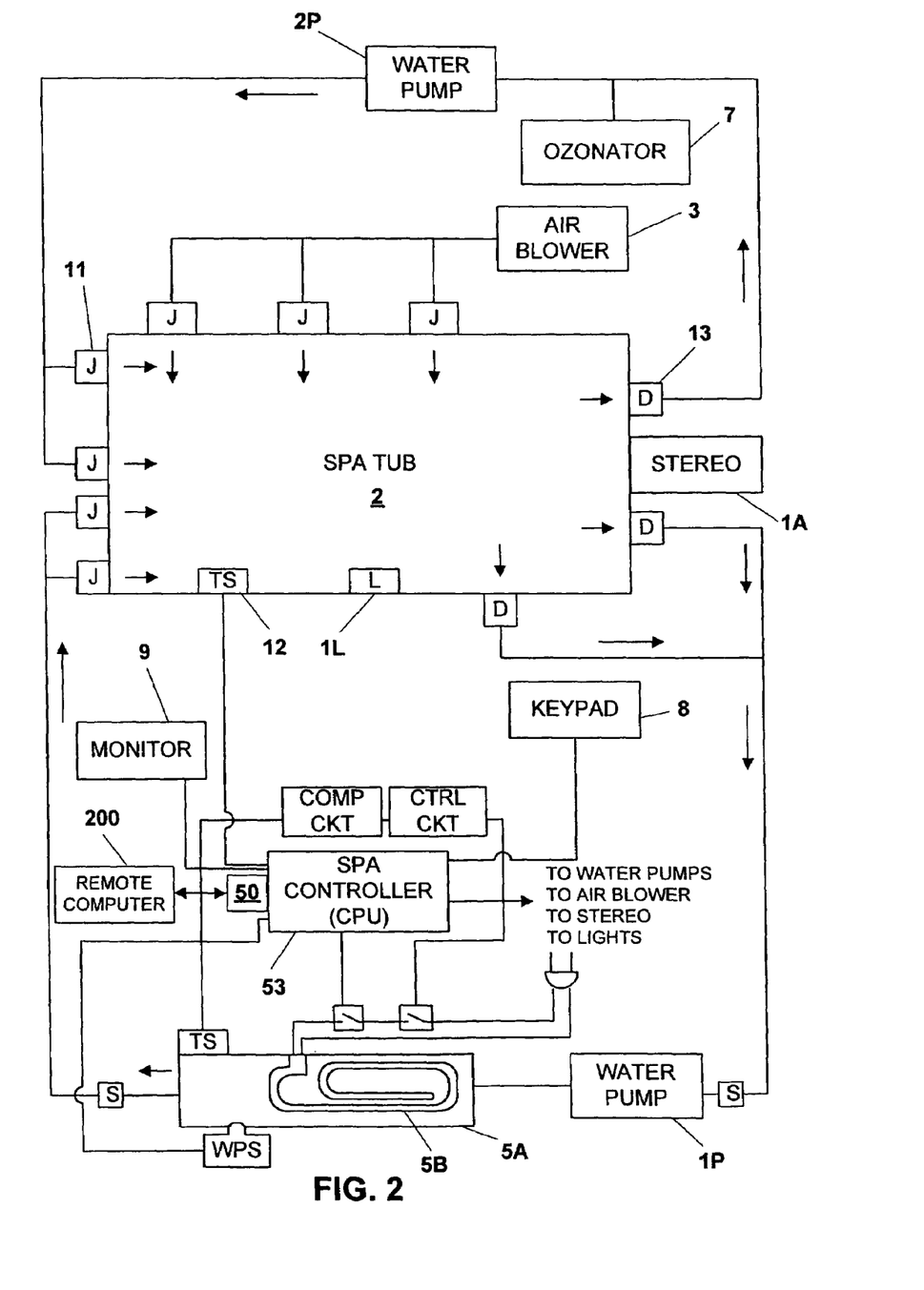
FIG. 2 shows a preferred embodiment of the present invention.

FIG. 2 shows a preferred embodiment of the present invention. Signal converter 50 is connected to spa controller 53. This allows commands and data to be sent to spa controller 50 from remote computer 200 and commands and data from sap controller 53 to be transferred to remote computer 200. Remote computer 200 may be connected to signal converter 50 via a wire or through wireless technology, (i.e., RF signal, IR signal or laser communication). Signal converter 50 converts the incoming signal to a protocol that is understood by the CPU of spa controller 53. In a preferred embodiment, the signal is converted to I2C. I2C is short for Inter-IC, a type of bus designed in the early 1980s, which is used to connect integrated circuits (ICs). I2C is a multi-master bus, which means that multiple chips can be connected to the same bus and each one can act as a master by initiating a data transfer.

Interface Signal Converter

Figures 3A, 3B:
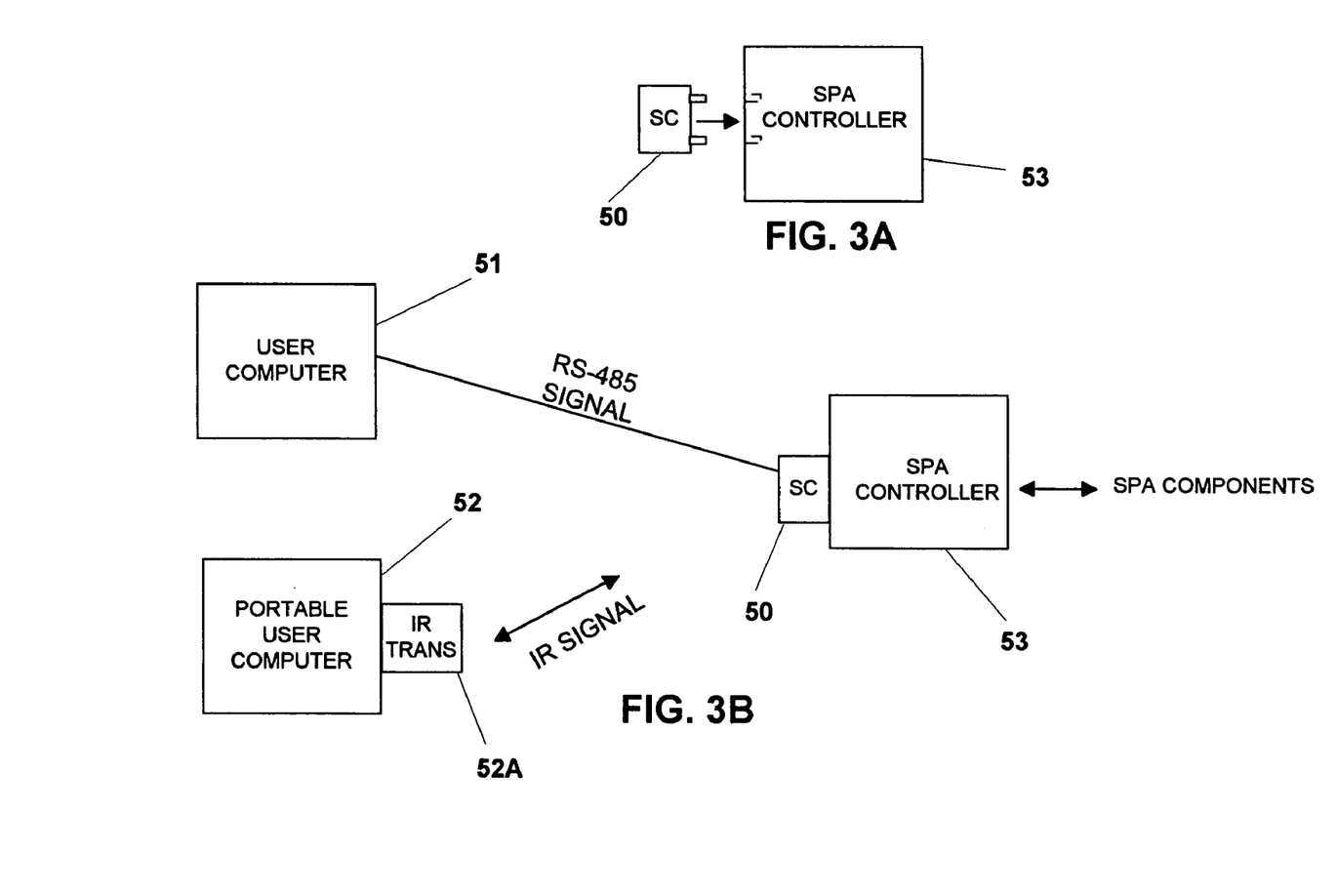
FIGS. 3A and 3B show other preferred embodiments of the present invention.

As shown in FIG. 3B, signal converter 50 can be used to connect user computer 51 or portable user computer 52 to spa controller 53 so that spa components can be remotely monitored and controlled. In a preferred embodiment, user computer 52 is a laptop computer. In another preferred embodiment, user computer 52 is a personal digital assistant (PDA). PDA's are portable computers that are usually smaller in size and less expensive than a normal laptop computer. A preferred PDA is a Palm Pilot. In a preferred embodiment, signal converter 50 is sold as a separate item that can inserted as needed into spa controller 53, as shown in FIG. 3A.

The basic function of signal converter 50 is to translate and route all signals from user computer 51 or portable user computer 52 to a signal that is usable with spa controller 53. In a preferred embodiment, an RS-485 signal is transmitted from user computer 51 and an infrared (IR) signal is transmitted from portable user computer 52. Signal converter 50 is capable of converting both signals to I2C for utilization with spa controller 53. Likewise, in the preferred embodiment, I2C signals coming from spa controller 53 can be converted by signal converter 50 to an RS-485 signal that can be used by user computer 51 or an IR signal that can be used by portable user computer 52.

Infrared Interface

Figure 4:
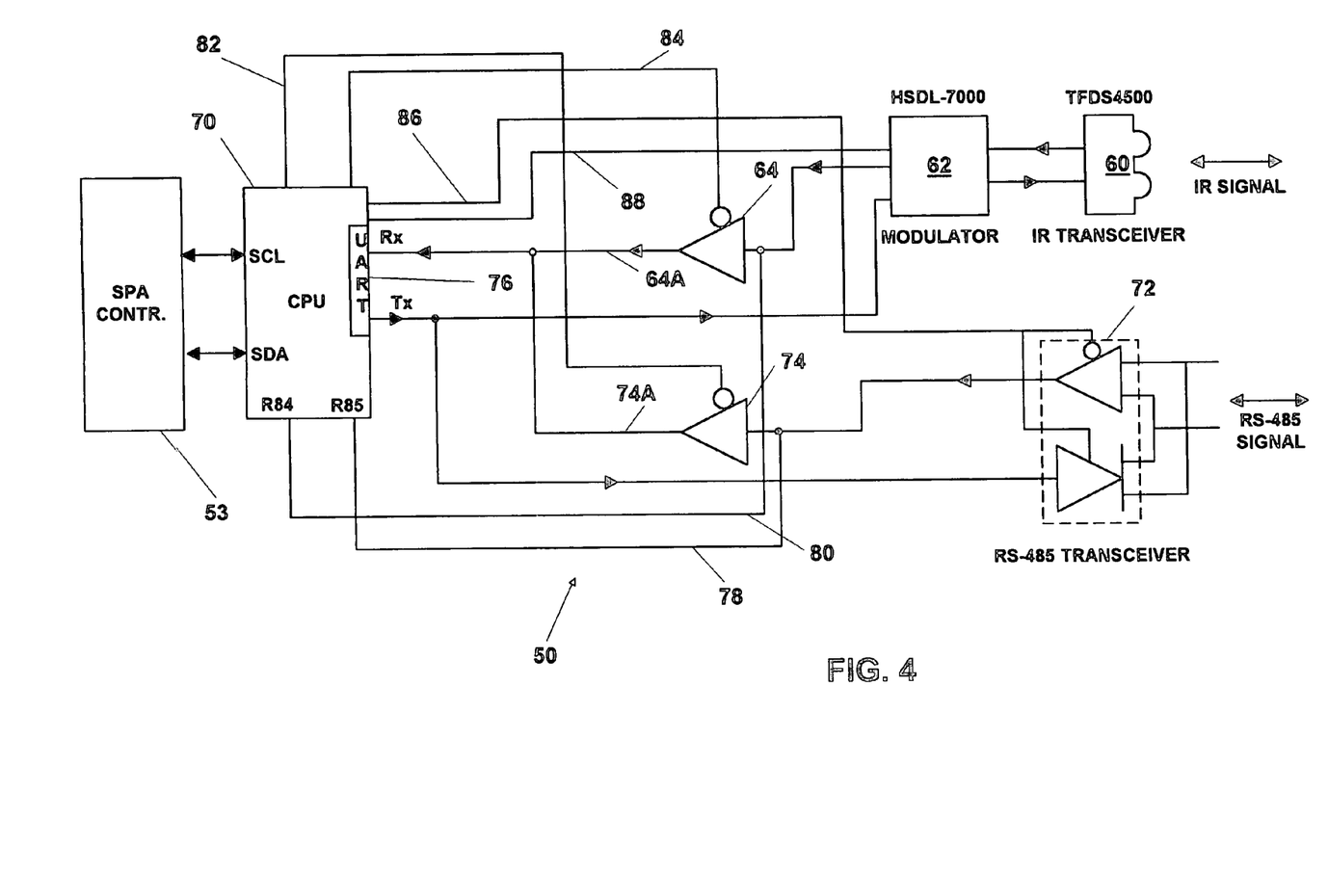
FIG. 4 shows a preferred signal converter.

As shown in FIG. 4, signal converter 50 receives an IR signal at IR transceiver 60. Modulator 62 then demodulates the signal. The digital signal leaving modulator 62 is then routed to buffer/multiplexer 64, then to CPU 70, and then to spa controller 53 on the I2C link.

Likewise, in transmission an I2C signal is received at CPU 70 from spa controller 53. The digital signal is modulated at modulator 62. The modulated signal is then transmitted as IR light by IR transceiver 60.

RS-485 Interface

The RS-485 interface is used to serially transmit or receive signals through wire connectivity. In a preferred embodiment, this interface is used with a personal computer, such as user computer 51 as shown in FIG. 3B. Since the RS-485 signal from user computer 51 travels via wire, user computer 51 can be located much farther away from signal converter 50 than can portable computer 52, which utilizes an IR interface.

An RS-485 differential serial signal is received by RS-485 transceiver 72 and converter to digital. The signal is then routed to buffer/multiplexer 74, then to CPU 70.

In transmission, a digital signal leaves CPU 70 and is converted to a differential RS-485 serial signal by RS-485 transceiver 72. This signal can then be used over long distances depending on the quality of wire connecting to user computer 51.

Buffer/Multiplexer

Since the preferred CPU 70 has only one UART 76 (UART 76 is a serial transmitter/receiver), the received signals coming into UART 76 must be multiplexed to avoid data "collisions" from each source. This is achieved by buffer/multiplexers 64 and 74, which are under the control of CPU 70. The CPU decides which "channel" it wants to listen to by selecting the proper lines 74A or 64A off the buffers 74 and 64.

CPU

As stated above, CPU 70 controls what input source it listens to (RS-485 or IR) and it transmits the received data to spa controller 53 as an I2C signal over the I2C link. In a preferred embodiment CPU 70 is an 8 bits CMOS flash microcontroller, part no. PIC16F876 manufactured by Microchip Technology, Inc. with offices in Chandler, Ariz.

To decide which source to listen to (i.e., RS-485 or IR), CPU 70 disables both buffers 74 and 64. It then listens to serial lines 78 and 80 on ports R84 and R85. As soon as a signal is detected on one or the other of serial lines 78 or 80, CPU 70 transmits a corresponding signal 82 or 84 to enable either buffer 74 or buffer 64, respectively. Once the appropriate buffer has been enabled, the signal is then allowed to flow to UART 76.

Once the signal is received at CPU 70, CPU 70 translates it to I2C and sends it over the I2C link in spa controller 53. Whatever command that was coded into the original message can then be carried out by spa controller 53. For example, a command might be to start a water pump or increase the temperature of the spa.

In a similar fashion, CPU 70 can receive serial data from spa controller 53 and transmit it over the serial IR or RS-485 links. In this case, serial data is routed to both IR transceiver 60 and RS-485 transceiver 72, but only one will actually transmit, depending on the states of the RS-485 enabling line 86 and IR enabling line 88. RS-485 enabling line 86 and IR enabling line 88 allow the user to choose whether data is transmitted over IR or RS-485.

Programmability of Remote Computer

As shown in FIG. 2, in a preferred embodiment remote computer 200 is capable of being programmed to meet the needs of the entity that is operating remote computer 200. In the case of the present invention, some of the different entities that could potentially operate remote computer 200 are the spa owner, the dealer that sold the spa, a service technician servicing the spa, the spa manufacturer, and the manufacturer of the spa controller for the spa.

Spa Owner

Figure 5A:
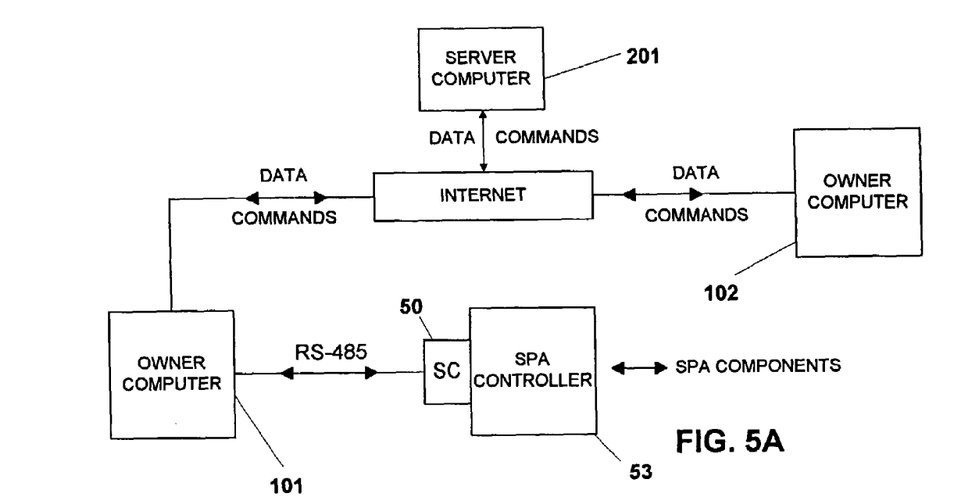
FIG. 5A shows another preferred embodiment of the present invention.

A preferred method by which a spa owner can utilize the present invention is illustrated by FIG. 5A. The spa owner can connect his personal home computer (first owner computer 101) to signal converter 50 via an RS-485 wire connection. He can then control the spa remotely from first owner computer 101. In the preferred embodiment, first owner computer 101 is programmed to include an owner page (which appears on the screen of a first owner computer 101) that enables the spa owner to interpret data transmitted to it from spa controller 53 via the RS-485 line and transmit commands back to spa controller 53.

Figure 6:
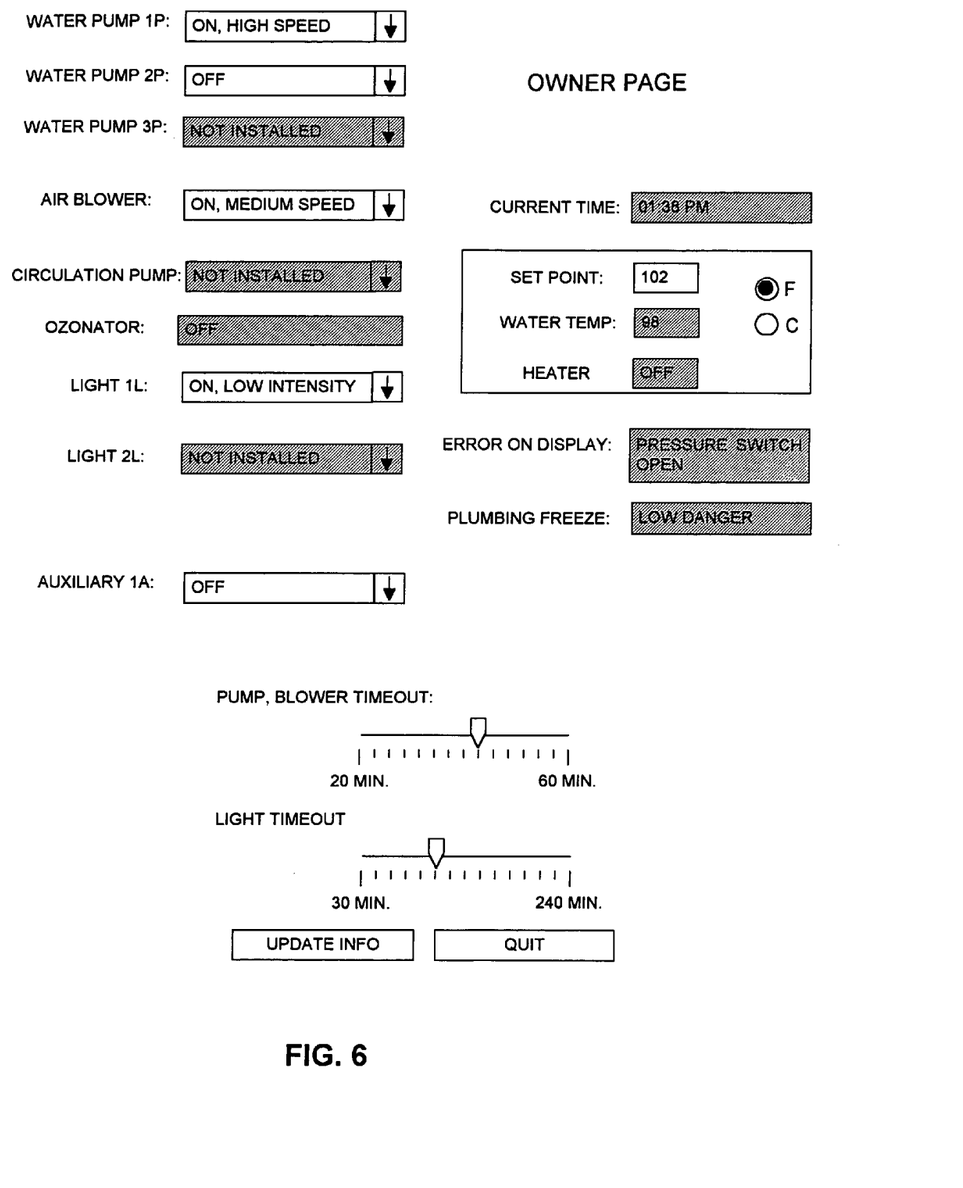
FIG. 6 shows a preferred owner page.

A preferred owner page is shown in FIG. 6. For example, some of the commands illustrated by FIG. 2 show that the owner has indicated that he wants water pump 1P (FIG. 1) to be "on" at high speed. He wants water pump 2 to be "off". He wants air blower 3 "on" at medium speed. He wants to spa temperature to be 102° F. He wants water pumps and air blower 3 to run for slightly over 40 minutes before they automatically turn off. Data indications displayed on the owner page indicate that the current spa tub temperature is 98° F. Heating element 5 is off. The error on displays is that the pressure switch is open. There is a low danger of plumbing freeze. The information is updated by clicking on update info bottom 110.

The owner page shown in FIG. 6 is just one preferred embodiment. Those of ordinary skill in the art will recognize that it is possible to reprogram the owner page to transmit a variety of different commands as well as monitor a variety of different spa conditions.

Spa Owner Controlling the Spa from a Remote Location via the Internet FIG. 5A shows a preferred embodiment in which the spa owner can log on to the Internet via first owner computer 101. He can then travel to another location and log on to the Internat via second owner computer 102. As with first owner computer 101, second owner computer 102 is also programmed to receive spa data and transmit commands for spa controller 53.

An example of a practical application of this embodiment can be found by the scenario in which the spa owner is heading home from his office that is approximately a 30 minute drive away. Before he leaves the office, the spa owner can log onto the Internet and go to the web site stored at server computer 201. He will then see an owner page similar to the one shown in FIG. 6. He will then upload his commands to server computer 201 to start the water pumps 1P and 2P, air blower 3 and heat the spa to 102° F. His commands will then be downloaded from server computer 201 via the Internet to first owner computer 101. Then they will travel from first owner computer 101 to signal converted 50 via the RS-485 line. Inside signal converter 50, the commands will be converted to an I2C protocol for spa controller 53 usage.

Spa Dealer

A spa dealer is the entity that sells the spa to the spa owner. Utilizing the present invention, the spa dealer can continue to monitor the condition of the spa and provide technical support for the spa after the spa is sold to the spa owner.

Figure 7:
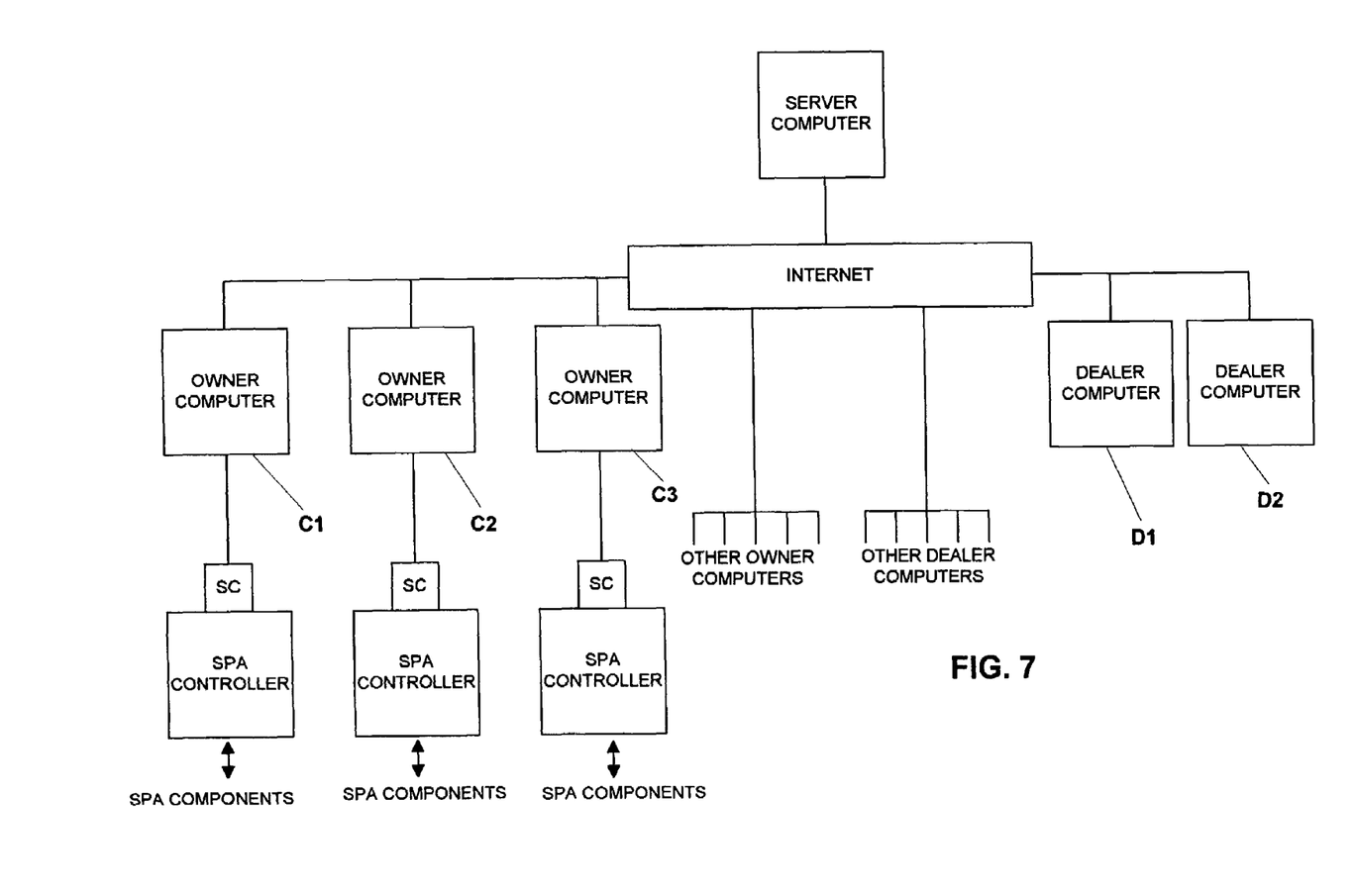
FIG. 7 shows another preferred embodiment of the present invention.

A preferred embodiment is shown in FIG. 7. In FIG. 7, a first dealer has sold a spa to an owner who has owner computer C1 and has sold a spa to an owner who has owner computer C2. A second dealer has sold a spa to an owner who has owner computer C3. After the spa owners have purchased their spas, they configure their computers so that they cam remotely monitor and control their spas, as explained above under the heading "Spa Owner".

In the preferred embodiment, owner computers C1-C3 are programmed to transmit data via the Internet. First deal computer D1 is programmed to receive data from the spas that the first dealer sold. Therefore, owner computer C1 and owner computer C2 will transmit spa data that will be monitored by first dealer computer D1. Likewise owner computer C3 will transmit spa data that will be monitored by second dealer computer D2.

In a preferred embodiment, owner computers C1-C3 are always logged onto the Internet, via either a cable modem or a DSL connection. Automatically per a given time period (for example, once every hour) owner computers C1-C3 are programmed to retrieve from their spa controllers data reporting the status of the spa. Then, this data is automatically transmitted via the Internet to the dealer that sold the spa owner his spa. In this fashion, the dealer is able to continuously monitor the condition of the spa.

Figure 8:
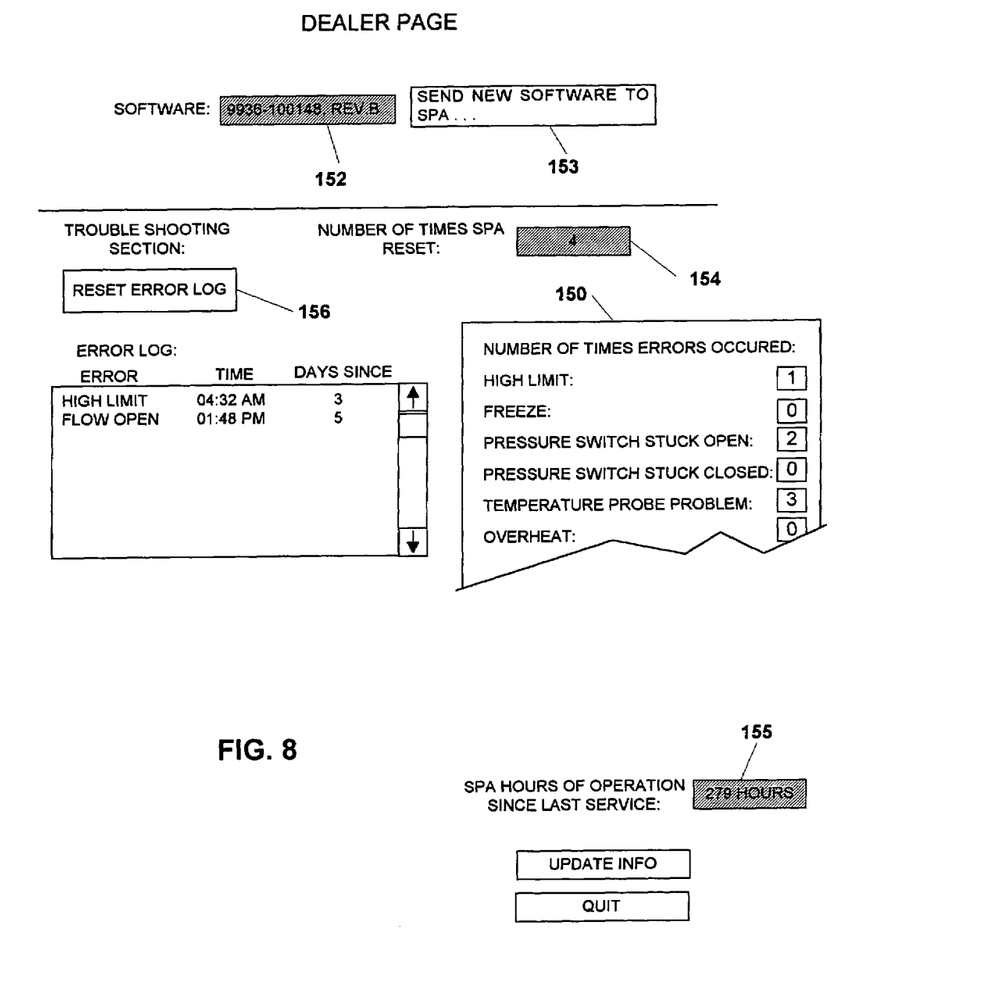
FIG. 8 shows another preferred embodiment of the present invention.

A preferred dealer screen is shown in FIG. 8. In block 150, the dealer can monitor the number of times and error has occurred. In block 151, the dealer can monitor when an error has occurred. The dealer can reset the error log by clicking on button 156. In block 152, the dealer can monitor the current software installed in spa controller 53. If there is a software update, the dealer can download this info by clicking on button 153. The dealer can also monitor the number of times the spa has been reset and the number of hours since the spa's last service.

By monitoring the condition of the spa and the number of times an error may have occurred, the dealer can alert the owner to a problem even before the owner knows about. Or, if the owner contacts the dealer with a problem, the dealer has access to valuable data that he could use to troubleshoot the problem. Utilizing this embodiment, the dealer may be able to tell the owner how to correct a problem without having to send a service technician to the owner's location.

The dealer page shown in FIG. 3 is just one embodiment. Those of ordinary skill in the art will recognize that it is possible to reprogram the dealer page to transmit a variety of different commands as well as monitor a variety of different spa conditions.

Service Technician

In another preferred embodiment, a service technician can utilize the present invention to more effectively troubleshoot and repair a spa. This preferred embodiment is described by reference to FIGS. 3A and 3B. In this preferred embodiment, the spa owner has purchased a spa with spa controller 53; however, he opted to not purchase signal converter 50. To help troubleshoot and repair the spa, a service technician can bring with him portable user computer 52 with IR intransceiver 52A and signal converter 50. As shown in FIG. 3A, the service technician first inserts signal converter 50 into spa controller 53. In a preferred embodiment, interface signal converter 50 fits snuggly into an easily accessible cavity in spa controller 53. Then, utilizing IR transceiver 52A with portable user computer 52, the service technician is able to download from spa controller 53 to portable user computer 52 data that includes a record of errors that may have occurred during the operational life of the spa, as shown in FIG. 3B. Portable user computer 52 is programmed to display this data in a format useful to the service technician. A preferred display is similar to the dealer display discussed above and shown in FIG. 8. By analysis of this data, the service technician will be able to more effective determine the required solution to repair the spa.

The Spa Manufacturer

Figure 9:
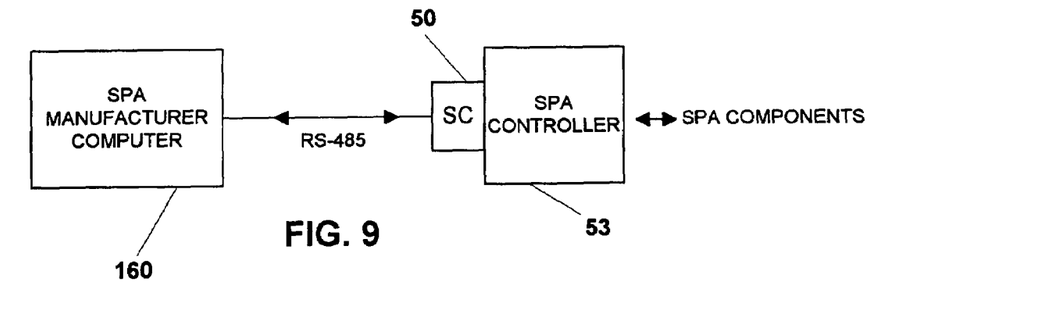
FIGS. 9 and 10 show other preferred embodiments of the present invention.
Figure 11:
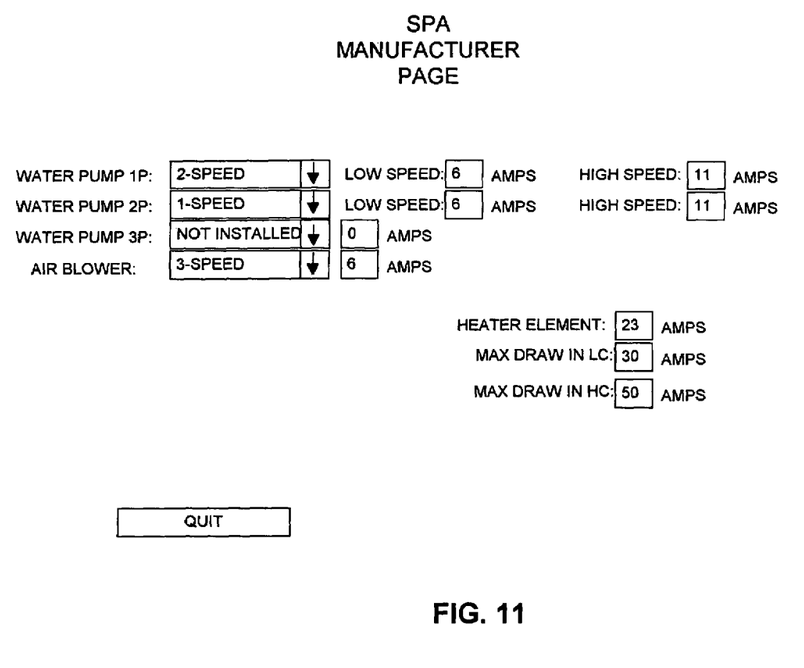
FIG. 11 shows a preferred spa manufacturer page.

In another preferred embodiment of the present invention, the spa manufacturer can utilize the present invention to configure the spa controller and the spa's components prior to the spa being transfected to the dealer. The user may later change some of these parameters, if he so desires. As shown in FIG. 9, spa manufacturer computer 160 is connected via the RS-485 line to signal converter 50, which is connected to spa controller 53. In the preferred embodiment, the spa components are installed and connected to spa controller 53. Spa manufacturer computer 160 is programmed to be able to transmit commands to and received data from spa controller 53. A preferred spa manufacturer screen is shown in FIG. 11. For example, as shown in FIG. 11, the spa manufacturer has configured water pump 1P to operate at "2-Speed" and has set it to operate at 6 amps for low speed and 11 amps for high speed. The spa manufacturer has configured air blower 3 (FIG. 1) to operate at "3-Speed" and at 6 amps. The heater element is set at 23 amps.

The spa manufacturer page shown in FIG. 11 is just one embodiment. Those of ordinary skill in the art will recognize that it is possible to reprogram the spa manufacturer page to transmit a variety of different commands as well as monitor a variety of different spa conditions.

The Manufacturer of the Spa Controller

The spa controller is a very important part of the spa. Its CPU is used to control the other components of the spa, such as the water pumps, the air blower and the heater. For safety considerations, the manufacturer of the spa controller may want to set parameters in spa controller 53 that cannot be modified by the other entities interfacing with the spa (i.e., spa manufacturer, spa dealer, service technician and spa owner).

Figure 10:
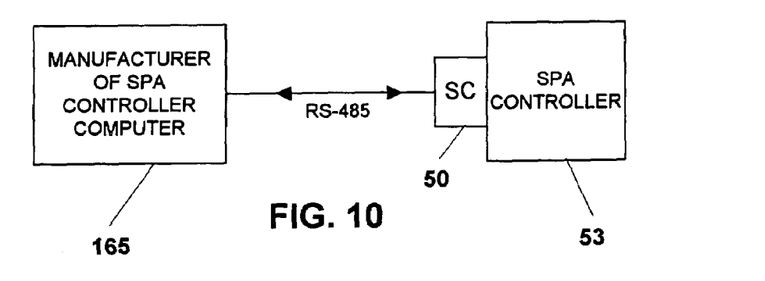
Figure 12:
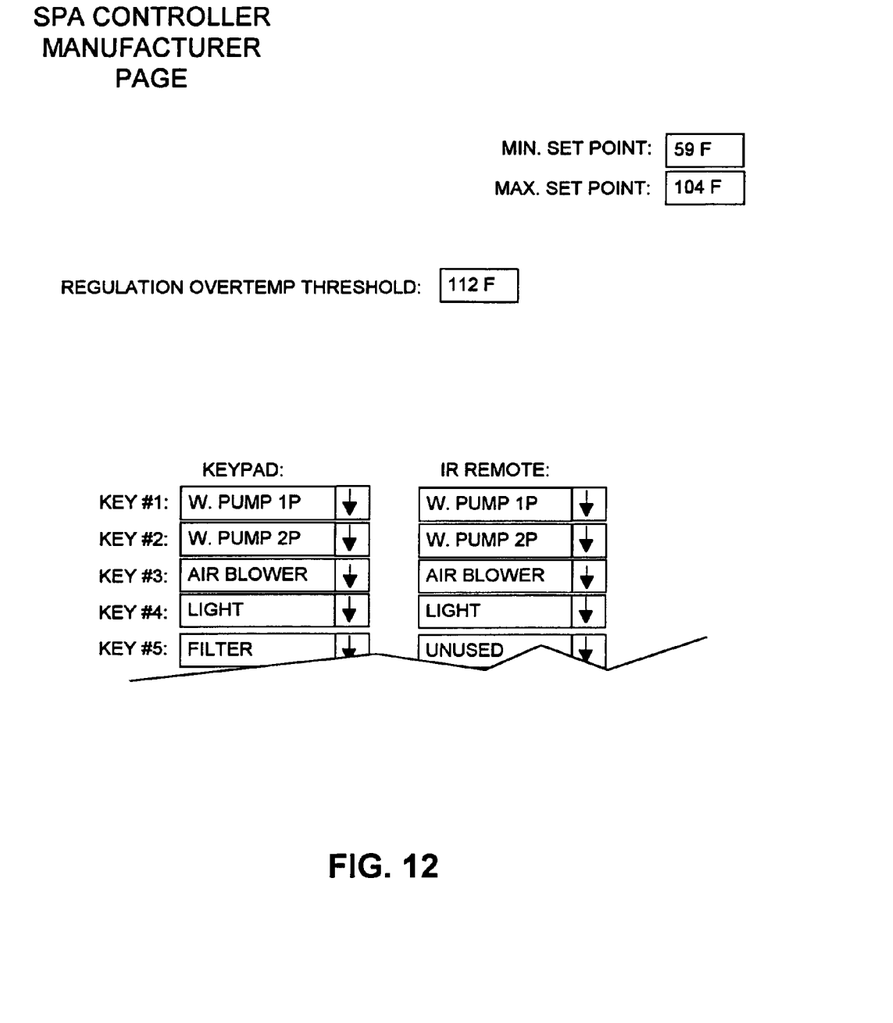
FIG. 12 shows a preferred spa controller manufacturer page.

FIG. 10 shows an embodiment wherein manufacturer of spa controller computer 165 is connected utilizing the present invention to spa controller 53. FIG. 12 shows a preferred spa controller manufacturer page. Here the spa controller manufacturer has set the minimum temperature inside the spa tub at 59° F. Any temperature lower than this could result in damage to spa's plumbing as a result of freezing because a temperature of lower than 59° F. at temperature sensor 12 (FIG. 2) is a strong indication that the water in the spa's plumbing is near the freezing point. He has set the maximum temperature inside the spa at 104° F. in accordance with industry regulations. Also, he has set the regulation temperature threshold at 112° F. Also, the manufacturer of the spa controller has indicated which keys on the keypad and IR remote are to control each spa component. For example, key #1 is set to control water pump 1P.

The manufacturer of the spa controller page shown in FIG. 12 is just one embodiment. Those of ordinary skill in the art will recognize that it is possible to reprogram the manufacturer of the spa controller page to transmit a variety of different commands as well as monitor a variety of different spa conditions.

Figure 5B:
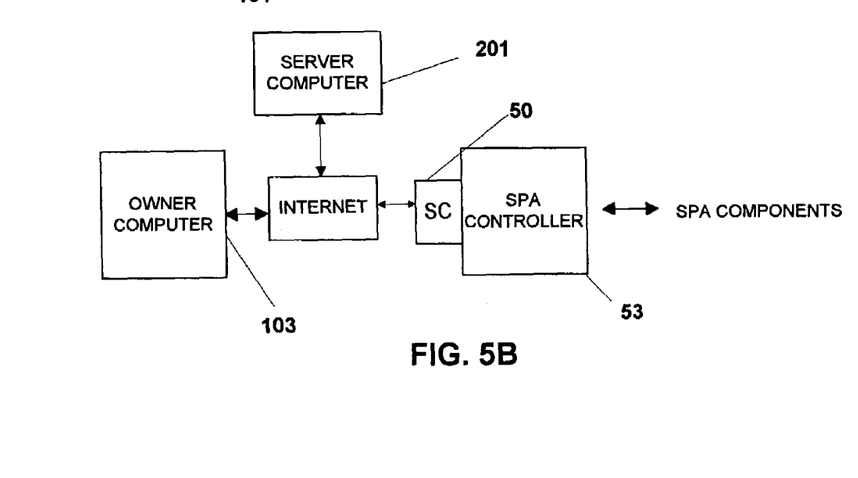
FIG. 5B shows another preferred embodiment of the present invention.
Figure 13:
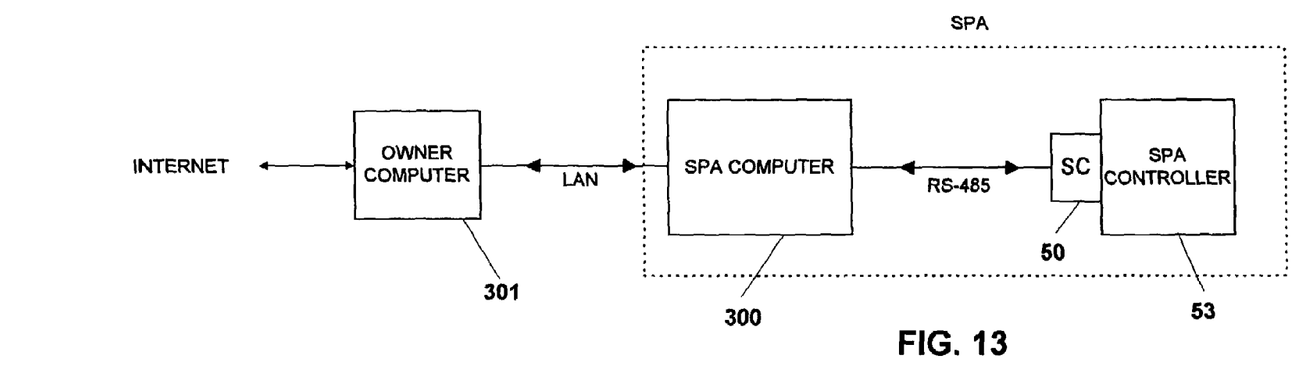
FIG. 13 shows another preferred embodiment of the present invention.
Figure 14:
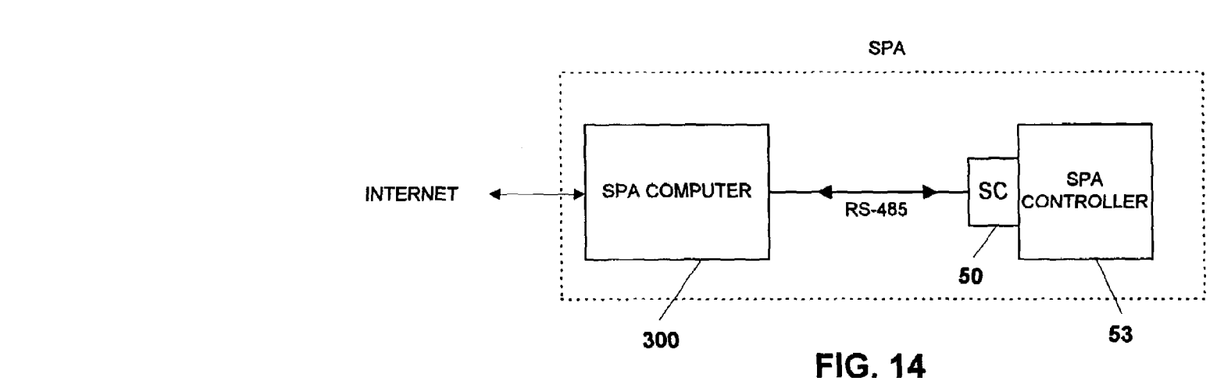
FIG. 14 shows another preferred embodiment of the present invention.

Although the above-preferred embodiments have been described with specificity, persons skilled in this art will recognize that many changes to the specific embodiments disclosed above could be made without departing from the spirit of the invention. Although the above preferred embodiments are discussed utilizing an RS-485 interface signal converter for communicating between spa controller 53 and remote computers, one of ordinary skill in the art would recognize that other electronic data interface signal converters could be used (such as, RS-232, RS-422 and RS-423, X10, Echelon, CEBus, Bluetooth and other protocol RF). Also, although the above embodiments discussed signal converter 50 used in conjunction with IR signals, it could be configured to work with other means of wireless communication signals, such as RF and laser. Also, one of ordinary skill in the art would recognize that it would be possible to configure signal converter 50 to convert three or more signals. For example, signal converter 50 could be configured to convert RS-485, IR and RF to I2C for utilization by spa controller 53. Also, although the above preferred embodiments showed signal converter 50 as a separate attachment to spa controller 53, it would be possible to sell spa controller 53 with signal converter 50 rigidly attached to it as one unit. Although preferred embodiments discussed utilizing the present invention in conjunction with the Internet, it would also be possible to utilize the present invention in conjunction with another computer network, such as a LAN or an Intranet. Although the above embodiments were discussed showing spa controller 53 utilizing an I2C link, the present invention would work with other types of spa controllers configured to operate utilizing links other than I2C links. Some other possible links are SIP (Serial Peripheral Interface) and UART or parallel interface links. In these embodiments the signal converter would need to be able to transfer communication signals from the remote computer to a signal utilized by the spa controler's link and the signals utilized by the spa controller's link to communication signals directed towards the remote computer. Also, although FIG. 5A shows second owner computer 102 connected to first owner computer 101 via the Internet, it would also be possible to configure interface signal converter 50 to be able to receive communication signals directly from remote owner compute 103 via the Internet, as shown in FIG. 5B. One of ordinary skill in the art would recognize that it is possible to configure the spa so that dedicated remote spa computer 300 (FIG. 13) is located adjacent to the spa. In a preferred embodiment, spa computer 300 would be located underneath the spa skirt. In the embodiment shown in FIG. 13, spa computer 300 is connected to owner computer 301 via a LAN. Owner computer 301 is then connected to the Internet. FIG. 14 shows another preferred embodiment in which spa computer 300 is connected directly to the Internet. In addition to sending commands and receiving data from spa controller 53, spa computer 300 could be used to log onto the Internet, send email, and supply audio and video functionality.

Also one of ordinary skill in the art would recognize that there are other types of portable remote computers that could be used with the present invention other than laptop computers and PDA's. For example, a cellular phone could be used as the remote computer to send commands and receive data from spa controller 53. Therefore, the attached claims and their legal equivalents should determine the scope of the invention.

We claim:

1. A spa control system, comprising:
    A) a heating module suitable for heating water;
    B) at least one water pump suitable for pumping water through said heating module;
    C) a spa controller adapted for controlling said heating module and said water pump at least in part on the basis of software installed on said spa controller;
    D) an interface signal converter in communication with said spa controller, said interface signal converter being operative for:
        establishing a communications link with a remote computer;
        receiving communication signals conveying software components over the communications link, said software components comprising updates to software already installed on said spa controller;
        communicating said software components to said spa controller for updating the software installed on said spa controller;
    wherein said interface signal converter converts communication signals received from the remote computer via said communications link and directs the converted signals to said spa controller, and
    wherein said interface signal converter converts signals from said spa controller to be communicated to the remote computer via said communications link.

2. The spa control system as in claim 1, wherein said interface signal converter comprises an RS transceiver.

3. The spa control system as in claim 2, wherein said RS transceiver is an RS-485 transceiver.

4. The spa control system as in claim 1, wherein said interface signal converter comprises an IR transceiver.

5. The spa control system as in claim 1, wherein said interface converter comprises an RF transceiver.

6. The spa control system as in claim 1, wherein said interface signal converter is capable of transceiving at least two different types of communication signals.

7. The spa control system as in claim 6, wherein said at least two different types of communication signals is an RS differential signal and an IR signal.

8. The spa control system as in claim 1, wherein said interface signal converter is removably attached to said spa controller.

9. The spa control system as in claim 8, wherein said spa controller defines a cavity, wherein said interface signal converter is removably attached to said spa controller via cavity.

10. The spa control system as in claim 1, wherein said interface signal converter is rigidly attached to said spa controller.

11. The spa control system as in claim 1, wherein said interface signal converter is rigidly attached to the spa controller as one unit.

12. The spa control system as in claim 1, wherein said interface signal converter is adapted for establishing a communications link with a remote computer over a wire-line link.

13. The spa control system as in claim 1, wherein said communications link is a wireless communications link.

14. The spa control system as in claim 1, wherein said interface signal converter is adapted for establishing a communications link with a remote computer through a computer network.

15. The spa control system as in claim 14, wherein said computer network is the Internet.

16. The spa control system as in claim 14, wherein said computer network is a LAN.

17. The spa control system as in claim 1, wherein said communications link is established over the Internet.

18. The spa control system as in claim 1, wherein said remote computer is a PDA.

19. The spa control system as in claim 1, wherein said remote computer is a cellular phone.

20. The spa control system as in claim 1, further comprising a spa skirt, and wherein said remote computer is located underneath said spa skirt.

21. The spa control system as in claim 1, wherein said remote computer is used to monitor and control the spa.

22. A spa control system as in claim 1, wherein said interface signal converter is further operative for:
receiving data comprising a record of errors from said spa controller;
transmitting a signal conveying the record of errors to the remote computer over said communications link.

23. A spa control system, comprising:
A) heating means suitable for heating water;
B) water pump means suitable for pumping water through said heating means;
C) a spa controller means adapted for controlling said heating means and said water pumping means at least in part on the basis of software installed on said spa controller means,
D) an interface signal converter means in communication with said spa controller means, said interface signal converter means being operative for:
establishing a communications link with a remote computer;
receiving communication signals conveying software components over the communications link, said software components comprising updates to software already installed on said spa controller means;
communicating said software components to said spa controller means for updating the software installed on said spa controller means;
wherein said interface signal converter means converts communication signals received from the remote computer means via said communications link, and wherein said interface signal converter means converts signals from said spa controller means to be communicated to said remote computer means via the communications link.

24. A spa control system as in claim 23, wherein said interface signal converter means is further operative for:
receiving data comprising a record of errors from said spa controller means;
transmitting a signal conveying the record of errors to the remote computer over said communications link.

25. A spa control system, comprising:
A) a heating module suitable for heating water;
B) at least one water pump suitable for pumping water through said heating module;
C) a spa controller adapted for;
controlling said heating module and said water pump at least in part on the basis of software installed on said spa controller; and
generating a record of errors associated with at least one of said heating module and said at least one water pump;
D) an interface signal converter in communication with said spa controller, said interface signal converter being operative for:
establishing a communications link with a remote computer;
receiving data comprising said record of errors generated at sad spa controller;
transmitting a signal conveying the record of errors to the remote computer over said communications link;
wherein said interface signal converter converts communication signals transferred from the remote computer via said communications link and directs the converted signals to said spa controller, and wherein said interface signal converter converts signals from said spa controller to be communicated to the remote computer via said communications link.

26. The spa control system as in claim 25, wherein said communications link is a wireless communications link.

27. The spa control system as in claim 25, wherein said remote computer is a cellular phone.

28. The spa control system as in claim 25, wherein said interface signal converter is integrated into said spa controller.

29. The spa control system as in claim 25, wherein said interface signal converter comprises an IR transceiver.

30. The spa control system as in claim 25, wherein said record of errors comprises the number of times an error has occurred.

31. A spa control system comprising:
A) a heating module suitable for heating water;
B) at least one water pump suitable for pumping water through said heating module;
C) a spa controller adapted for controlling said heating module and said water pump at least in part on the basis of software installed on said spa controller;

D) an interface signal converter in communication with said spa controller, said interface signal converter being operative for exchanging signals with a hand-portable remote computer over a wireless communications link, wherein the signals received from said hand-portable remote computer include software components comprising updates to software already installed on said spa controller, said interface signal converter being further operative for communicating said software components to said spa controller for updating the software installed on said spa controller.

32. The spa control system as in claim 31, wherein said hand-portable remote computer is a PDA.

33. The spa control system as in claim 31, wherein said hand-portable remote computer is a cellular phone.

34. The spa control system as in claim 31, wherein said interface signal converter converts signals transferred from the hand-portable remote computer via said wireless communications link and directs the converted signals to said spa controller, and wherein said interface signal converter converts signals from said spa controller to be communicated to the hand-portable remote computer via said wireless communications link.

35. The spa control system as in claim 31, wherein said hand-portable remote computer is a PDA device.

36. A spa control system as in claim 31, wherein said interface signal converter means is further operative for:
   receiving data comprising a record of errors from said spa controller means;
   transmitting a signal conveying the record of errors to the remote computer over said communications link.

37. A spa control system comprising:
A) a interface signal converter;
B) a spa controller in communication with said interface signal converter, said spa controller being adapted for controlling a set of spa components at least in part on the basis of software installed on said spa controller;
C) said interface signal converter being operative for:
   establishing a communications link with a remote computer;
   receiving information conveying software components over the communications link;
   transmitting signals conveying the software components to the spa controller;
D) said spa controller being operative for:
   receiving signals conveying the software components from said interface signal converter;
   updating software already installed on said spa controller at least in part on the basis of the software components received from interface signal converter.

38. The spa control system as in claim 37, wherein said interface signal converter comprises an RS transceiver.

39. The spa control system as in claim 38, wherein said RS transceiver is an RS-485 transceiver.

40. The spa control system as in claim 37, wherein said interface signal converter comprises an IR transceiver.

41. The spa control system as in claim 37, wherein said interface signal converter comprises an RF transceiver.

42. The spa control system as in claim 37, wherein said interface signal converter is capable of transceiving at least two different types of communication signals.

43. The spa control system as in claim 42, wherein said at least two different types of communication signals include an RS differential signal and an IR signal.

44. The spa control system as in claim 37, wherein said interface signal converter is removably attached to said spa controller.

45. The spa control system as in claim 37, wherein said interface signal converter is rigidly attached to said spa controller.

46. The spa control system as in claim 37, wherein said spa controller include a body, said interface signal converter being an integral part of the body of said spa controller.

47. The spa control system as in claim 37, wherein said interface signal converter is adapted for establishing a communications link with a remote computer over a wire-line link.

48. The spa control system as in claim 37, wherein said communications link is a wireless communications link.

49. The spa control system as in claim 37, wherein said interface signal converter is adapted for establishing a communications link with a remote computer through a computer network.

50. The spa control system as in claim 49, wherein said computer network is the Internet.

51. The spa control system as in claim 37, wherein said remote computer is a PDA.

52. The spa control system as in claim 37, wherein said remote computer is a cellular phone.

53. A spa control system as in claim 37, wherein said interface signal converter means is further operative for:
   receiving data comprising a record of errors from said spa controller means;
   transmitting a signal conveying the record of errors to the remote computer over said communications link.

\* \* \* \* \*